United States Patent

[11] 3,566,807

| [72] | Inventors | George H. Blanchard<br>Kilburn Hall;<br>William Dixon, Twickenham, England |
|---|---|---|
| [21] | Appl. No. | 764,775 |
| [22] | Filed | Oct. 3, 1968 |
| [45] | Patented | Mar. 2, 1971 |
| [73] | Assignees | Spillers Limited<br>London, ;<br>Wallace & Tiernan Limited<br>Tonbridge, England |
| [32] | Priority | Oct. 6, 1967 |
| [33] | | Great Britain |
| [31] | | 45710/67 |

[54] PROCESSES FOR MAKING BREAD
17 Claims, 1 Drawing Fig.

[52] U.S. Cl. .................................................. 107/54,
99/90
[51] Int. Cl. .................................................. A21d 2/22
[50] Field of Search .......................................... 107/54,
54(.2(, 54(.28); 99/90; 18/(Inquired)

[56] References Cited
UNITED STATES PATENTS
| 1,725,036 | 8/1929 | Wihlfahrt | 107/54(.2) |
| 2,514,301 | 7/1950 | Tenney | 107/54(.2)X |

*Primary Examiner*—Walter A. Scheel
*Assistant Examiner*—Arthur O. Henderson
*Attorney*—Beveridge & De Grandi ABSTRACT: There is disclosed a process for the continuous production of dough from normal bleached and treated flour, in which a stream of about three-quarters of the flour and a stream of a suspension of yeast in water are mixed under controlled conditions in a first mixing stage to form a batter which is fed to a second mixing stage in which the remainder of the flour, any remainder of the water are added and mixed under controlled conditions to form dough, which is delivered as a continuous flow of dough to a divider. Fat and/or improvers and/or additives can be included in either or both the mixing stages and the normal fermentation period can be eliminated.

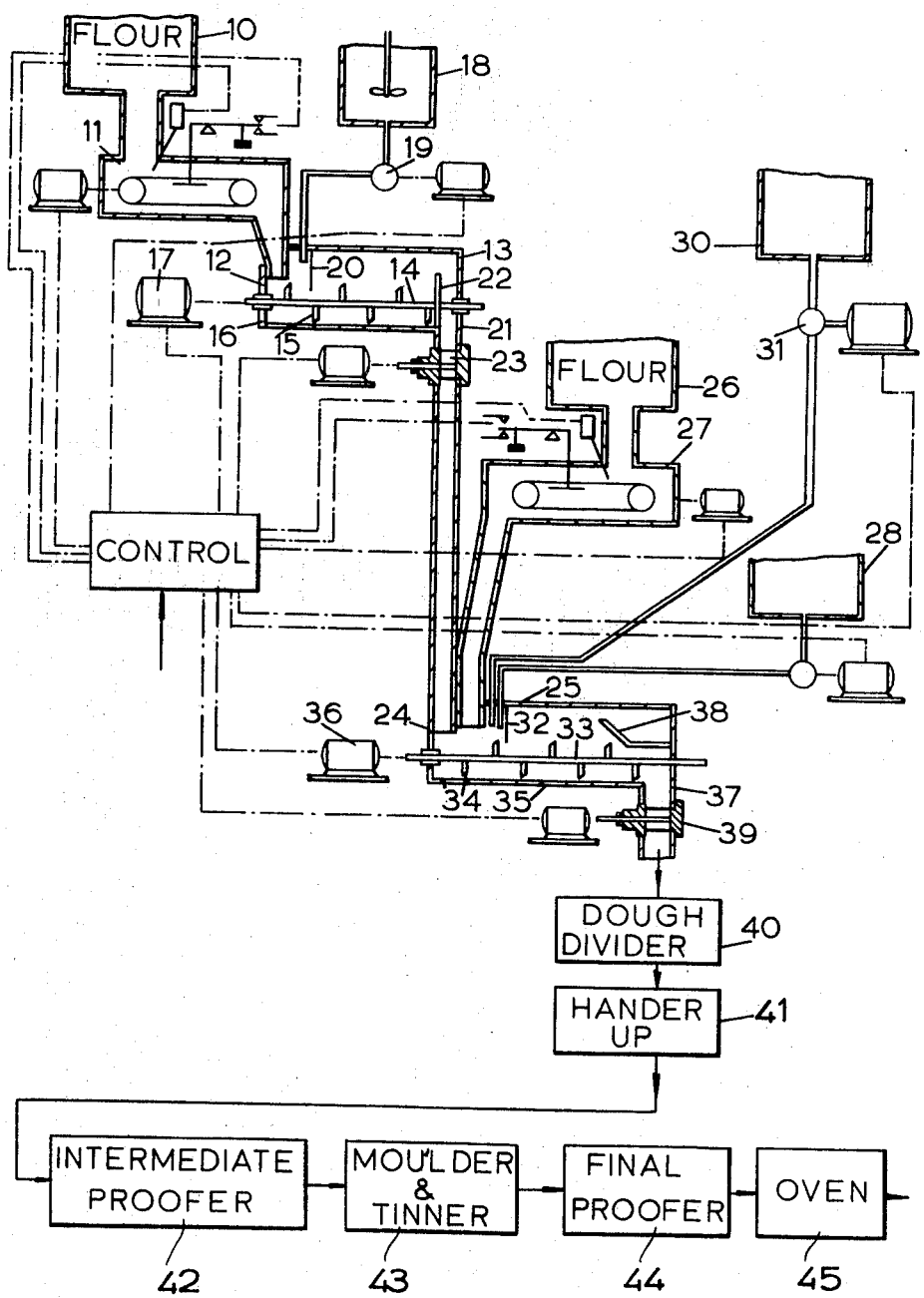

PROCESSES FOR MAKING BREAD

The present invention relates to a process for making bread.

There has already been proposed a process of making bread from normally bleached and treated flour, which comprises as a first stage making a batter with three-quarters of the flour and all or nearly all the water and all the yeast, then beating such batter at high speed in a conventional high speed mixer or in a speed modified conventional mixer, and thereafter, as a second stage, without any standing period, adding the remainder of the flour and any remainder of the water and completing the mixing to form a dough. The dough is divided or scaled after the mixing without any fermentation period and is thereafter made into bread by proofing and baking.

Such process is carried out on a batch basis and the dough after the second stage mixing is fed to the divider. The dough from a single mixing is usually passed into a hopper capable of holding all that dough, and from this it is fed to the divider which works substantially continuously so that as a result there is a difference in time between the dividing of the dough first into the hopper and the dough last out of the hopper. This delay can result in irregular processing of the dough and can be critical with a dough developed to its optimum extent. It is now realized that with high energy dough development improved results can be obtained by providing a regular stream of dough thus eliminating such delay. In modern machine baking the process of dividing a mass of dough into pieces by volume or by weight, and, after a recovery period, moulding, tinning, proofing and baking are effected substantially continuously, that is to say, the dough is dealt with as it arrives and substantially all the dough is equally treated.

It is therefore an object of the present invention to provide a process of bread making in which a two-stage batter and dough process is in the form of a continuous mixing process.

According to the present invention a process for the continuous production of dough from normally bleached and treated flour, comprises feeding a metered stream of about three-quarters of the flour and a metered stream of a suspension of all the yeast in all or nearly all the water into a first mixing stage and mixing it under controlled conditions to form a batter, feeding the batter to a second mixing stage wherein a metered stream of the remainder of the flour, a metered stream of and remainder of the water, and, if desired, a metered stream of fat, are added, completing the mixing in the second stage under controlled conditions to form dough and delivering a continuous flow of dough to feed a divider without any variation in holding time.

By using the process of the present invention the fermentation period can be eliminated since the dough is mixed and the protein of the flour developed in such a manner that the fermentation period is not necessary. Furthermore the power or work level required in the process of the present invention is less than that believed to be required in the so-called "No Time Dough" process in which the dough is mechanically developed.

To give improved flavor, crumb color, and texture, enzyme active soya flour can be incorporated in the first stage mixing.

It is not essential for all the water to be incorporated in the first stage; for example up to about 15 percent of the total water can be incorporated in the second stage. Likewise any other ingredients such as fat, and/or one or more improvers may be incorporated wholly in the first stage or wholly in the second stage or in part in the first stage and in part in the second stage. Amongst such improvers may be mentioned enzyme active soya flour (which contains the enzyme lipoxidase), ascorbic acid, potassium bromate, potassium iodate, azodicarbonamide, L-cysteine, sodium meta bisulphite. The fat may be in the form of a fat-glyceryl monostearate emulsion with the relative proportions of 4 pound bread fat with 10 oz. glyceryl monostearate and sufficient water to make 8 pound emulsion.

A mixing machine used for effecting the first stage mixing should be of a type capable of dealing with a thin batter produced in the first stage mixing, and the mixing machine used for effecting the second stage mixing should be of a type capable of handling the more normal dough produced in the second stage mixing, and both should be capable of putting into the batter and dough a required work level. Whilst any suitable commercially available mixing machine may be used, those having a pair of paddle blade-bearing shafts rotatable in a troughlike chamber are preferable; one that is particularly suitable is that disclosed in British Patent Specification No. 735,184. The metering of the streams of flour may be effected in any convenient manner but electric scale feeders such as those marketed under the name 'Merchen' by Wallace & Tiernan Ltd. are especially suitable. Likewise, whilst any commercially available metering pumps may be used for regulating the feed of liquid ingredients such as the suspension of yeast in water, those marketed under the name 'E.C.D. type G.50V' by Wallace & Tiernan Ltd. are especially suitable.

The invention will be further described by way of example with reference to the accompanying diagrammatic drawing which illustrates one form of apparatus in which the process of the present invention can be carried out.

Flour from a hopper 10 is fed through an electric scale feeder 11 to an inlet end 12 of the first stage mixer 13 having two shafts of which one is indicated at 14, and each having adjustable inclined paddle blades 15, both of which shafts are rotatable in a troughlike chamber 16 by an electric motor 17. A suspension of yeast in water is constantly agitated in a tank 18 from which it is fed through a metering pump 19 into the inlet end 12 of the mixer 13. Near the inlet end 12 there is provided a baffle 20 for preventing the escape of flour dust. Near the discharge end 21 of the mixer 13 there is provided an adjustable weir 22. In the first mixer 13, flour, water and yeast are mixed by the paddles 15 to form a batter and the paddles are so driven as to impart a required work level to the batter and advance it along the chamber 16.

The batter is fed by a pump 23 to inlet end 24 of a second mixer 25. The remainder of the flour is fed to the inlet end 24 from a hopper 26 through an electric scale feeder 27, and any remainder of the water if fed from a tank 28 through a metering pump 29. A further tank 30 and a further metering pump 31 may be provided for the addition of fat is desired. The second mixer is provided near its inlet end 24 with a baffle 32 for preventing the escape of flour dust and is also provided with two rotatable shafts of which one is indicated at 33, each having adjustable inclined paddle blades 34, both of which shafts being rotatable in a troughlike chamber 35 by an electric motor 36. In the second mixer 25 dough is formed and developed, the paddles being so driven as to impart a required work level to the dough and advance it along the chamber 35 towards outlet end 37 near which a baffle 38 is provided. The developed dough is discharged through a pump 39 direct to a dough divider 40 without any standing time and is thereafter handled in a conventional manner, including for example a hander up 41, intermediate proofer 42, moulder and tinner 43, final proofer 44 and oven 45.

Both the first mixer 13 and the second mixer 25, and both the pump 23 and the pump 39 are preferably of the type disclosed in British Patent Specification No. 735,184. The electric scale feeders 12 and 27 are preferable of the type marketed by Wallace & Tiernan Ltd. under the name "Merchen" and the metering pumps 19, 29 and 31 similarly are preferably of the type marketed by Wallace & Tiernan Ltd. under the name 'E.C.D. type G.50V.'

If desired to feed fat to the first mixer 13, the tank 30 and metering pump 31 may alternatively be arranged to feed into the inlet end 12 of the first stage mixer 13.

The total work level produced in both mixers 13 and 25 will be much less than that believed to be required in the so-called "No time dough" process in which the dough is mechanically developed.

Dough treatment chemicals or additives, including the reducing agents 1-cysteine and/or sodium metabisulphite, may be introduced into either one or the other or both the mixer stages. In many cases they may be added to the water in tank 18 and/or in tank 28.

The speeds of the shafts of the first mixer 13 and of the second mixer 25 may be raised or lowered according to the throughput required through the work level will be held substantially constant, the speeds of the shafts in the first and second mixers may be substantially the same or may be different according to requirements.

The following examples illustrate how the process of the present invention can be used in the machine baking plant.

As the process is a continuous one it is more convenient to express the quantities of ingredient used as a percentage per 100 pound of flour, thus: for each 100 pound of flour 61 percent water
    2.0 percent yeast
    1.75 percent salt
    0.7 percent enzyme active soya flour
    0.7 percent fat in addition between 15 and 100 parts per million of additives and/or improvers such as ascorbic acid, potassium bromate, azodicarbonamide, L-cysteine, sodium metabisulphite may be added.

Examples I to VI relate to a plant capable of handling 9 sacks per hour, i.e. 2,520 pounds of flour per hour, whilst example VII relates to a plant capable of handling 10 sacks per hour, i.e. 2,280 pounds of flour per hour.

EXAMPLE I

A suspension of all the yeast and all the soya flour in 87.5 percent of all the water required to a production run of one hour was made up and continually agitated in the tank 18 and maintained at a temperature in the region of 80 to 82° F. Flour was delivered from the hopper 10 at the rate of 30.5 pounds per minute to the first stage mixer 13 corresponding to 72.5 percent of the total flour, and yeast suspension was fed from tank 18 at the rate of approximately 24 pound per minute corresponding to 87.5 percent of the total water requirement.

The shafts of the first mixer were rotated at a speed of about 110 r.p.m. and the work level was between 0.05 and 0.15 h.p. minute/pound. The water, yeast and flour were beaten into a batter by the paddles and advanced along the length of the chamber 16 during a period of approximately 3 minutes, and during this time the batter has become much more whiter and the protein mellowed or conditioned.

The batter was discharged from the first stage mixer at a rate approximately 55.0 pound per minute and fed directly to the inlet end 24 of the second stage mixer 25. Flour was fed at a rate of approximately 11.0 pounds per minute and water containing the salt and additives was fed at the rate of approximately 4.0 pound per minute to the inlet end of the second stage mixer, these rates corresponding respectively to the remainder of the total flour and total water requirements. The shafts were rotated at about 90 r.p.m. and the work level was between 0.075 and 0.2 h.p. minute/ pound of dough. The dough was formed, worked and kneaded during its passage along the chamber 35 which took approximately 3 minutes at the end of which time it was found to be sufficiently fully developed to such an extent that it was ready to be fed directly to a divider for subsequent treatment in a conventional manner.

The total work level over the two stages together was much less than that believed to be required for the 'No Time Dough' mechanical dough development process.

EXAMPLE II

All the water required, all the yeast required and the additives and improvers were fed to the first stage mixer together with between 65 percent and 75 percent of the total flour requirements, and the remainder of the flour, between 25 percent and 35 percent was added into the inlet end of the second stage mixer. The shaft speeds and times of travel through the first and second mixer chambers were the same as in example I.

EXAMPLE III

The process described in example I was followed with the exception that instead of adding the soya flour to the yeast suspension in tank 18, 25 to 35 parts per million of l-cysteine was added as a reducing agent.

EXAMPLE IV

The process described in example I was followed with the exception that instead of adding the soya flour to the yeast suspension in tank 18, 7½ to 10 parts per million of sodium metabisulphite were added as a reduced agent.

EXAMPLE V

The process described in example I was followed with the exceptions that instead of adding soya flour to the yeast suspension in tank 18, approximately 98 percent of all the water required was used together with all the yeast and a reducing agent either 25 to 35 parts per million of l-cysteine or 7½ to 10 parts per million of sodium metabisulphite. The remainder of the total water requirement, 2 percent, together with the 30 parts per million ascorbic acid and 25 parts per million potassium bromate as oxidants were fed to the inlet of the second stage mixer. The speeds of the shafts and the angles of the paddles were adjusted so that a dough of suitable consistency for feeding to the divider is delivered from the second stage mixer.

EXAMPLE VI

The process described in example 1 was followed with the exception that instead of adding soya flour to the yeast suspension in tank 18, a mixture of soya flour, fat, yeast improvers and oxidants was fed in dry with a suitable feeder into inlet end 12.

EXAMPLE VII

A suspension of all the yeast and all the soya flour in 85.4 percent of all the water required to a production run of 1 hour was made up and continually agitated in the tank 18 and maintained at a temperature in the region of 70° to 80° F. Flour was delivered from the hopper 10 at the rate of 31.6 pound per minute to the first stage mixer 13 corresponding to 68 percent of the total flour, and yeast suspension was fed from tank 18 at the rate of approximately 25.6 pound per minute corresponding to 85.4 percent of the total water requirement.

The shafts of the first mixer were rotated at a speed of about 110 r.p.m. and the work level was between 0.05 and 0.1 h.p. minute/pound. The water, yeast and flour were beaten into a batter by the paddles and advanced along the length of the chamber 16 during a period of approximately 3 minutes, and during this time the batter has become much whiter and the protein mellowed or conditioned.

The batter was discharged from the first stage mixer at a rate of approximately 57.7 pound per minute and fed directly to the inlet end 24 of the second stage mixer 25. Flour was fed at a rate of approximately 15.0 pound per minute and water containing the salt and additives was fed at the rate of approximately 5.1 pound per minute to the inlet end of the second stage mixer, these rates corresponding respectively to the remainder of the total flour and total water requirements. The shafts were rotated at about 110 r.p.m. and the work level was between 0.075 and 0.2 h.p. minute/pound of dough. The dough was formed, worked and kneaded during its passage along the chamber 35 which took approximately 3 minutes at the end of which time it was found to be sufficiently fully developed to such an extent that it was ready to be fed directly to a divider for subsequent treatment in a conventional manner.

The total work level over the two stages together was much less than that believed to be required for the "No Time Dough" mechanical dough development process.

The water containing the salt and additives was maintained at a temperature in the region of 86° F. and the temperature of the dough fed to the divider was in the region of 86° F. The time of the dough in the intermediate proofer was 3 minutes 16 seconds and, after a period of about 48 minutes at a temperature of about 105° F. and a relative humidity of 82 percent in the final proofer, the dough was baked for about 36 minutes at a temperature of about 460° F.

It will be appreciated by one skilled in the art that variations in the percentage of water used in each or both of the two stages and the percentage of yeast used in the nature and quantities of improver and/or additives, may be made in accordance with day to day requirements in accordance with variations in the nature and/or dryness of the flour used. Moreover, times, temperatures and relative humidities referred to above examples are purely by way of illustration and may be subject to similar variations within a reasonable range, such as ±5° F. or ±5 percent as will be well known by one skilled in the art.

We claim:

1. A process for the continuous production of dough from normally bleached and treated flour and at least yeast and water, which comprises feeding a metered stream of about three quarters of the flour and a metered stream of a suspension of all the yeast in at least a proportion of all the water into a first mixing stage, mixing the said flour, the said yeast and the said water under controlled conditions to form a batter, feeding the said batter to a second mixing stage, adding into said second mixing stage a metered stream of the remainder of the flour, and a metered stream of any remainder of the water, completeing the mixing in the second stage under controlled conditions to form dough and delivering a continuous flow of dough to feed a divider without any variation in holding time.

2. A process according to claim 1, in which enzyme active soya flour is incorporated in said first stage mixing.

3. A process according to claim 1 in which said remainder of the water added in said second mixing stage is not more than 15 percent of the total water.

4. A process according to claim 1 in which fat is incorporated in at least one of said mixing stages.

5. A process according to claim 4 in which fat is incorporated wholly in the first stage mixing.

6. A process according to claim 4 in which fat is incorporated wholly in the second stage mixing.

7. A process according to claim 4 in which fat is incorporated in part in the first stage mixing and in part in the second stage mixing.

8. A process according to claim 4 in which said fat comprises a fat-glyceryl monostearate emulsion.

9. A process according to claim 8 in which said emulsion has the relative proportions of 4 pounds bread fat with 10 ozs. glyceryl monostearate and sufficient water to make 8 pounds emulsion.

10. A process according to claim 1 in which at least one improver or additive is incorporated in at least one of said mixing stages.

11. A process according to claim 10 in which said improvers or additives is incorporated wholly in the first stage mixing.

12. A process according to claim 10 in which said additive or improver is incorporated wholly in the second stage mixing.

13. A process according to claim 10 in which said one additive or improver is incorporated in part in the first stage mixing and in part in the second stage mixing.

14. A process according to claim 10 in which at least one improver or additive is selected from the group consisting of the enzyme lipoxidase, ascorbic acid, potassium bromate, potassium iodate, azodicarbonamide, L-cysteine, sodium meta bisulphide.

15. A process according to claim 1 in which the total work level produced in both the mixing stages is not more than 0.2 h.p. minute per pound of dough.

16. A process according to claim 15 in which the time duration of the first stage mixing is about 3 minutes.

17. A process according to claim 15 in which the time duration of the second stage mixing is about 3 minutes.